US009251118B2

(12) United States Patent
Doi et al.

(10) Patent No.: US 9,251,118 B2
(45) Date of Patent: Feb. 2, 2016

(54) SCHEDULING COMPUTATION PROCESSES INCLUDING ALL-TO-ALL COMMUNICATIONS (A2A) FOR PIPELINED PARALLEL PROCESSING AMONG PLURALITY OF PROCESSOR NODES CONSTITUTING NETWORK OF N-DIMENSIONAL SPACE

(75) Inventors: Jun Doi, Kanagawa (JP); Yasushi Negishi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 13/510,196

(22) PCT Filed: Nov. 15, 2010

(86) PCT No.: PCT/JP2010/070314
§ 371 (c)(1),
(2), (4) Date: May 16, 2012

(87) PCT Pub. No.: WO2011/059090
PCT Pub. Date: May 19, 2011

(65) Prior Publication Data
US 2012/0233621 A1  Sep. 13, 2012

(30) Foreign Application Priority Data
Nov. 16, 2009  (JP) ................. 2009-261113

(51) Int. Cl.
*G06F 9/46* (2006.01)
*G06F 15/173* (2006.01)
(Continued)

(52) U.S. Cl.
CPC ............ *G06F 15/803* (2013.01); *G06F 9/5066* (2013.01); *G06F 7/38* (2013.01); *H04L 29/08072* (2013.01)

(58) Field of Classification Search
CPC ....... G06F 7/38; G06F 15/803; G06F 9/5066; H04L 29/08072
USPC .............. 718/102; 711/141; 712/11; 709/201
See application file for complete search history.

(56) References Cited

U.S. PATENT DOCUMENTS 5,826,033 A  10/1998  Hayashi et al.
6,711,607 B1 *  3/2004  Goyal ........................... 709/203
(Continued)

FOREIGN PATENT DOCUMENTS

EP  0544532 A2  6/1993
JP  3116357  5/1991
(Continued)

OTHER PUBLICATIONS

Adiga etal., Blue Gene/L torus interconnection network, 2005, IBM J. Res. & Dev., vol. 49, 265-276.*
(Continued)

*Primary Examiner* — Abdullah Al Kawsar
*Assistant Examiner* — Abu Ghaffari
(74) *Attorney, Agent, or Firm* — Scully, Scott, Murphy & Presser, P.C.; Jennifer Davis, Esq.

(57) ABSTRACT

Optimally scheduling a plurality of computation processes including all-to-all communications (A2A) among a plurality of nodes (processors) constituting an n-dimensional (a torus or a mesh) network.
The plurality of nodes (processors) constituting the network are divided into a communication (computation process) phase (A2A-L) required for all-to-all communications only among a plurality of nodes included in a first subgroup and a communication (computation process) phase (A2A-P) required for all-to-all communications only among a plurality of nodes included in a second subgroup to perform parallel processing with the phases overlapped with each other across a plurality of threads (thread 1, thread 2, thread 3, and thread 4). It is also possible to perform the parallel processing with respect to a plurality of computation processes such as a fast Fourier transform (FFT) and a transpose (T) (internal transpose).

18 Claims, 6 Drawing Sheets

(51) Int. Cl.
*G06F 15/80* (2006.01)
*G06F 9/50* (2006.01)
*H04L 29/08* (2006.01)
*G06F 7/38* (2006.01)

(56) References Cited

U.S. PATENT DOCUMENTS

| | | | | |
|---|---|---|---|---|
| 7,185,138 | B1* | 2/2007 | Galicki | H04L 49/15 |
| | | | | 710/316 |
| 7,281,119 | B1* | 10/2007 | Cofler et al. | 712/216 |
| 7,761,687 | B2* | 7/2010 | Blumrich et al. | 712/11 |
| 7,853,147 | B2* | 12/2010 | Tanaka et al. | 398/57 |
| 8,185,656 | B2* | 5/2012 | Hosokawa | 709/238 |
| 8,291,427 | B2* | 10/2012 | Archer et al. | 718/104 |
| 2007/0006193 | A1* | 1/2007 | Babaian et al. | 717/149 |
| 2007/0195777 | A1* | 8/2007 | Tatar | H04L 49/1546 |
| | | | | 370/392 |
| 2008/0092146 | A1* | 4/2008 | Chow et al. | 719/313 |
| 2008/0133633 | A1* | 6/2008 | Bhanot | G06F 9/52 |
| | | | | 708/404 |

FOREIGN PATENT DOCUMENTS

| | | |
|---|---|---|
| JP | 4235654 A | 8/1992 |
| JP | H05151181 A | 6/1993 |
| JP | 7200508 A | 8/1995 |
| JP | 2601591 B2 | 4/1997 |
| JP | H09153029 A | 6/1997 |
| JP | 3675537 | 7/2005 |

OTHER PUBLICATIONS

Kumar et al., Optimization of All-to-All Communication on the Blue Gene/L Supercomputer, 2008, 320-329.*

Horie, Takeshi et al., "All-to-All Personalized Communication on a Wraparound Mesh," Parallel Computing Research Center, Fujitsu Laboratories, Ltd. (1993), pp. 628-637.

Japanese Search Report dated Feb. 1, 2011 issued in PCT/JP2010/070314.

English language Abstract of Japanese Patent Application No. JP07-200508A, dated Aug. 4, 1995.

English language Abstract of Japanese Patent Application No. JP2601591B, dated Apr. 16, 1997.

English language Abstract of Japanese Patent Application No. JP04-235654A, dated Aug. 24, 1992.

English language Abstract of Japanese Patent Application No. JP03-116357A, dated May 17, 1991.

Horie et al., "All-to-All Personalized Communication on a Wraparound Mesh", IPSJ Journal, vol. 34, No. 4, Information Processing Society of Japan, Apr. 15, 1993 pp. 628-637.

* cited by examiner (A) TRANSFORMING 1D FFT (LENGTH N) INTO 2D FFT ($N_1$, $N_2$) ($N=N_1 \times N_2$) TO COMPUTE 1D FFT ON PARALLEL COMPUTER
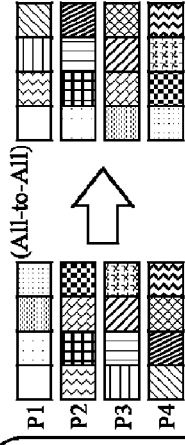
$$y_k = \sum_{j=0}^{n-1} x_j w_n^{jk}$$
$$y(k_2, k_1) = \sum_{j_1=0}^{n_1-1} \sum_{j_2=0}^{n_2-1} x(j_1, j_2) w_{n_2}^{j_2 k_2} w_{n_1 n_2}^{j_1 k_2} w_{n_1}^{j_1 k_1}$$
$$w_n^{jk} = \exp(-2\pi i/n)$$
$x(N_1, N_2)$
$x_1(N_1, N_2/np)$ $x_2(N_1, N_2/np)$ ... $x_{np}(N_1, N_2/np)$
(B) PARALLELIZED 1D FFT ALGORITHM
(C) All-toAll communication
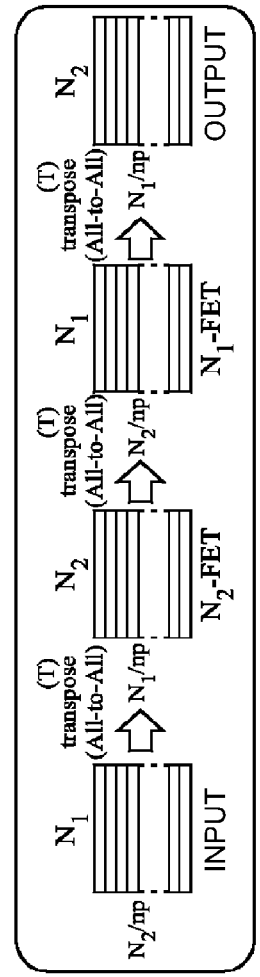
FIG. 1

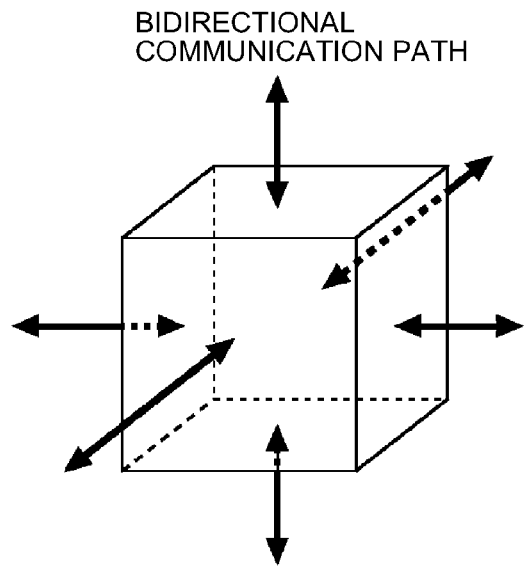
(A) IMAGE OF NODE (PROCESSOR)
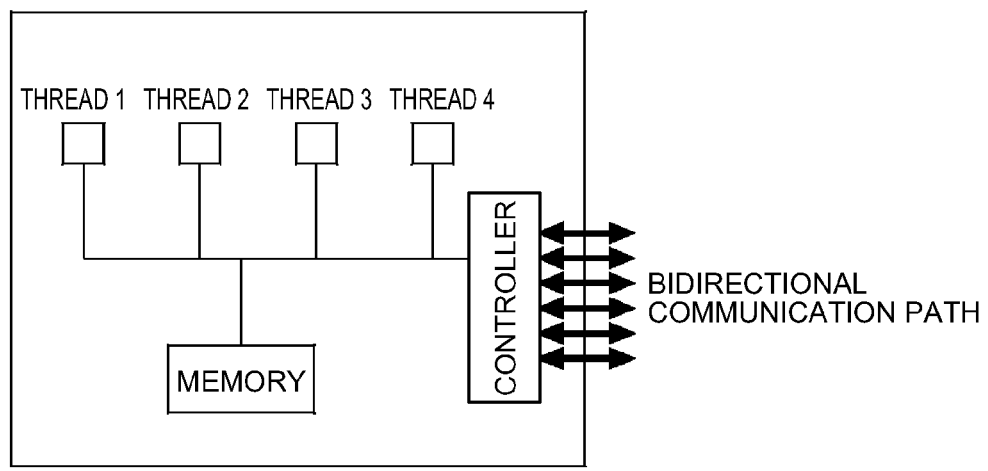
(B) INTERNAL CONFIGURATION OF NODE (PROCESSOR)
FIG. 2

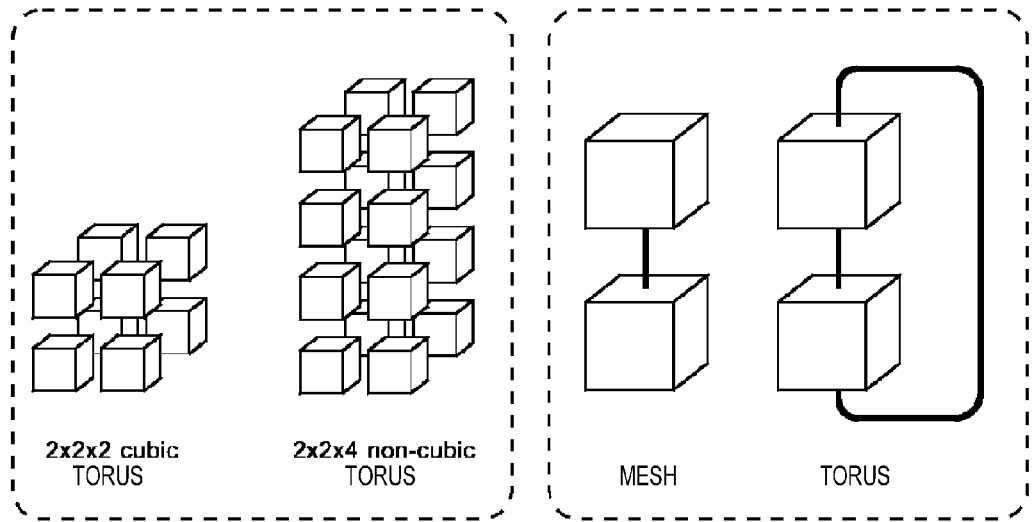

PERFORMANCE OF PARALLELIZED 1D FFT IN Blue Gene®/P

| NUMBER OF NODES (PROCESSORS) | AXES OF NODES (PROCESSORS) CONSTITUTING TORUS (FORM BASED ON DIMENSIONS) | 1D FFT GFLOPS | PROPORTION OF All-to-All | All-to-All bandwidth |
|---|---|---|---|---|
| 512 | 8x8x8 (cubic) | 310 | 54% | 324 MB/sec |
| 1024 | 8x8x16 (non-cubic) | 313 | 70% | 116 MB/sec |

↑ ALTHOUGH THE PEAK PERFORMANCE SHOULD BE DOUBLED, THE PERFORMANCE IS MAINTAINED.

↑ THE LENGTH OF THE LONGEST AXIS IS DOUBLED AND THUS THE BANDWIDTH IS HALVED.

FIG. 4

| NUMBER OF NODES (PROCESSORS) | AXES OF NODES (PROCESSORS) CONSTITUTING TORUS (FORM BASED ON DIMENSIONS) | GFLOPS (WHEN THE PRESENT INVENTION IS NOT USED) | GFLOPS (WHEN THE PRESENT INVENTION IS USED) |
|---|---|---|---|
| 512 | 8x8x8 (cubic) | 310 | 423 (x1.36) |
| 1024 | 8x8x16 (non-cubic) | 313 | 595 (x1.90) |
| 2048 | 8x16x16 (non-cubic) | 689 | 1072 (x1.56) |
| 4096 | 16x16x16 (cubic) | 1403 | 2184 (x1.56) |

SCHEDULING COMPUTATION PROCESSES INCLUDING ALL-TO-ALL COMMUNICATIONS (A2A) FOR PIPELINED PARALLEL PROCESSING AMONG PLURALITY OF PROCESSOR NODES CONSTITUTING NETWORK OF N-DIMENSIONAL SPACE

CROSS-REFERENCE TO RELATED APPLICATIONS

The present invention relates to and claims the benefit of the filing date of commonly-owned, co-pending PCT Patent Application No. PCT/JP2010/070314, filed Nov. 15, 2010, which further claims the benefit of priority date of commonly-owned, co-pending Japanese Patent Application No. JP 2009-261113, filed on Nov. 16, 2009, the entire contents and disclosure of which is incorporated by reference as if fully set forth herein.

FIELD OF THE INVENTION

The present invention relates to optimally scheduling a plurality of computation processes including all-to-all communications (A2A) among a plurality of nodes (processors) constituting an n-dimensional (torus or mesh) network.

BACKGROUND ART

In parallel computers connected via a torus or mesh network, the performance of communication among a plurality of nodes (processors) significantly affects the speed of computation processes. As a typical communication pattern, there has been known an all-to-all communication (A2A for short), in which all nodes send data different from each other to other all nodes, requiring the largest amount of communication traffic. The all-to-all communication is known as communication frequently used in a lot of computations including a matrix transpose (T for short) and a fast Fourier transform (FFT for short).

Patent Document 1 defines that a matrix transpose in FFT computation or computation as a two-dimensional (2D) FFT in one-dimensional (1D) FFT computation is the general state of the art. The one-dimensional FFT is processed across a plurality of processors and the two-dimensional FFT is processed across a plurality of processors.

Patent Document 2 describes an idea of making more efficient processing within the all-to-all communication in an n-dimensional torus by superimposing phases. Here, the present invention is described by comparison with Patent Document 2. The present invention is to convert an all-to-all communication to a plurality of partial all-to-all communications to pipeline the all-to-all communications, while the present invention does not include an implementation method within the all-to-all communication and therefore is intended for a different purpose. In addition, scheduled objects of the present invention differ from those of Patent Document 2, and Patent Document 2 does not include the superposition of processes other than those of an all-to-all communication on processes within the all-to-all communication as in the present invention.

PRIOR ART REFERENCES

Patent Documents

[Patent Document 1] Japanese Patent No. 3675537
[Patent Document 2] Japanese Patent No. 2601591

SUMMARY OF THE INVENTION

Problems to Be Solved by the Invention

It is desired to make more efficient a plurality of computation processes including all-to-all communications (A2A) among a plurality of nodes (processors) constituting an n-dimensional (torus or mesh) network.

Means for Solving the Problems

The plurality of nodes (processors) constituting the network are divided into a computation process phase (A2A-L) required for all-to-all communications only among a plurality of nodes included in a first subgroup and a communication phase (A2A-P) required for all-to-all communications only among a plurality of nodes included in a second subgroup to perform parallel processing with the phases overlapped with each other across a plurality of (Nt) threads (thread 1, thread 2, thread 3, thread 4, - - - thread Nt).

Advantages of the Invention

It is possible to optimally schedule a plurality of computation processes including all-to-all communications (A2A) among a plurality of nodes (processors) constituting an n-dimensional (torus or mesh) network and therefore to improve computing performance.

BRIEF DESCRIPTION OF THE DRAWINGS

FIG. 1 is a schematic diagram for describing a computation process of a one-dimensional (1D) FFT (length N) on a parallel computer;

FIG. 2 is a schematic diagram illustrating the configuration of a node (processor);

FIG. 4 is a diagram illustrating how the performance of a parallelized 1D FFT varies according to the configuration of the numbers on the axes of the nodes (processors) constituting a torus;

FIG. 6 is a diagram illustrating how the performance of a parallelized 1D FFT varies according to the configuration of the numbers of the nodes (processors) on the axes constituting a torus as an effect of applying the present invention.

MODE FOR CARRYING OUT THE INVENTION

Figure 3:
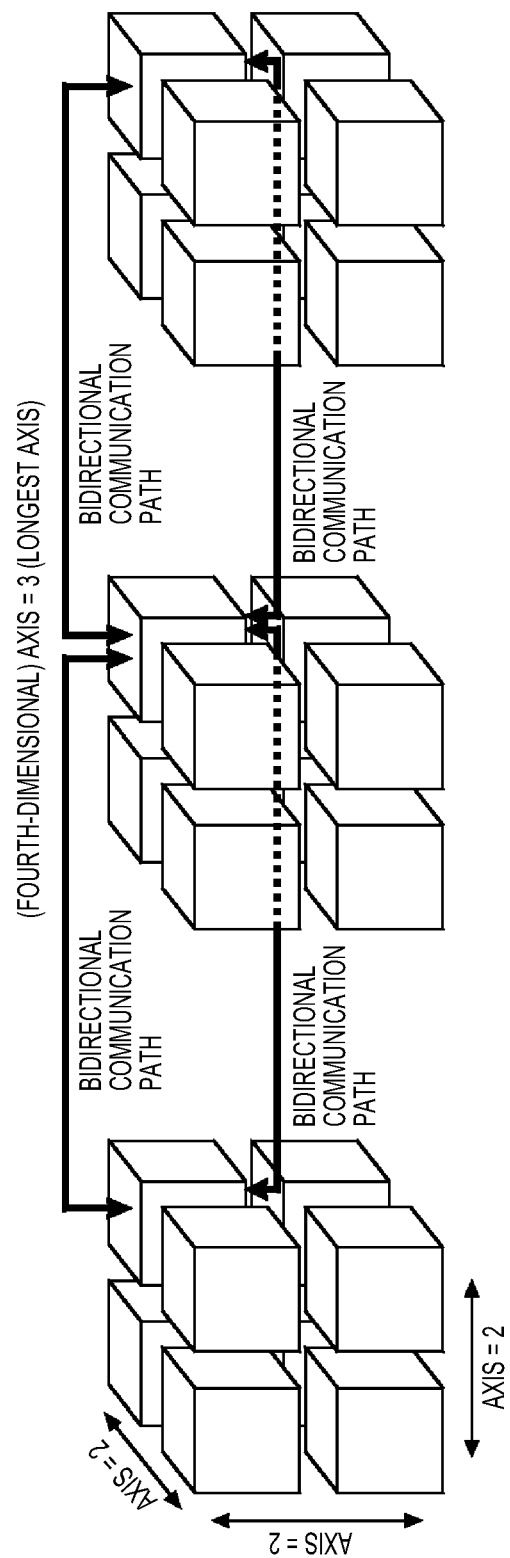
FIG. 3 is diagram illustrating a four-dimensional torus network as a schematic diagram for describing a network dimension and the longest axis.

FIG. 1 shows a schematic diagram for describing a computation process of a one-dimensional (1D) FFT (length N) on a parallel computer.

FIG. 1(A) shows that parallel processing is performed by transforming a 1D FFT (length N) into a two-dimensional (2D) FFT ($N_1$, $N_2$) ($N=N_1 \times N_2$) in order to compute the 1D FFT on the parallel computer and then dividing the 2D FFT into two FFTs having lengths $N_1$ and $N_2$, respectively. In other words, FIG. 1(A) shows that the parallel processing is performed with different directions in two dimensions (2D) of $N_1$ and $N_2$. It should be noted here that np indicates the number of processors (nodes).

FIG. 1(B) shows a parallelized 1D FFT algorithm. It is known that computation in the parallelized 1D FFT requires three-time transpose "T" in the course of obtaining an output from an input. It is described as the general state of the art also in Patent Document 1, for example.

FIG. 1(C) shows that the transpose "T" is processing in which rows and columns are interchanged. Supposing that i is a row number and j is a column number, FIG. 1(C) shows that the position of a pattern corresponding to ij is interchanged with the position of a pattern corresponding to ji. In a first stage, all-to-all communications (A2A) are used to perform processing with being blocked in units of a pattern. Therefore, in a second stage, it is required to perform an internal transpose (IT) within the block.

FIG. 2 shows a schematic diagram illustrating the configuration of a node (processor). In FIG. 2(A), one node is expressed as a cubic image. The use of this type of expression facilitates imaging of six bidirectional communication paths (or alternatively 12 unidirectional communication paths) for communicating from six faces of the cube with other spatially adjacent nodes (processors) and facilitates imaging of the configuration of a three-dimensional network.

FIG. 2(B) shows the internal configuration of a node (processor). The parallel computer has a feature of having a plurality of threads, some of which are called multi-threads. Those resembling the multi-threads are multi-cores, multi-processors, and the like called in various ways, but they are not necessarily distinguished uniquely from each other when used. Naturally, the application of the present invention is intended to enable parallel processing (pipelining) within a node (processor) and overlapping of contents to be processed and therefore there is no meaning in positively distinguishing these resemblances from each other.

It is known that there are products various in the number of threads within one node (processor). In this specification, four threads, namely thread 1, thread 2, thread 3, and thread 4 are shown. Although a thread is typically hardware, it is possible to embody a thread as software devised to serve as hardware or as a combination of hardware and software.

Moreover, the node (processor) contains a memory, which stores information on which communication processing monopolizes the thread at the current time, information (for example, in the form of a table or the like) on which communication processing is to be executed by the thread at the next time, and the like. Although the memory is typically embodied as hardware, it is also possible to form a virtual area in combination with software.

Moreover, the node (processor) contains a controller, which controls access permissions on messages transmitted or received via communication paths. The controller is able to be embodied as hardware, as software, or as a combination of hardware and software.

A scheduling method of the present invention is able to work autonomously for each node (processor) or to work in cooperation with a plurality of adjacent nodes (processors) constituting a subgroup. It is also possible to provide the scheduling method as a program (or a program product) having a plurality of codes which each node (processor) is able to run. Moreover, it is possible to provide the scheduling method as a parallel computer system, which enables scheduling of the present invention, as a group of a plurality of nodes (processors).

FIG. 3 shows a four-dimensional torus network as a schematic diagram for describing a network dimension and the longest axis. As has already been described, the use of the three-dimensional network will facilitate intuitive imaging of the network as six bidirectional communication paths for communicating via six faces of the cube shown in FIG. 2.

Here, adjacent eight cubes constitute one subgroup and three subgroups are arranged in the horizontal direction. The numbers on the axes of a subgroup are counted, along the familiar coordinates such as an x-axis, a y-axis, and a z-axis, as 2 on the x-axis, 2 on the y-axis, and 2 on the z-axis by counting the nodes (processors) as L, M, and N or the like. In this specification, the lengths of all axes are equal and expressed as 2×2×2, in which these three axes have the same length.

In addition, a four-dimensional network will be described here. In this diagram, two more bidirectional communication paths are added (in a form in which the bidirectional communication paths are visible also in three-dimensional space) from one node (processor) as bidirectional communication paths for connecting three subgroups arranged in the horizontal direction, and therefore it is possible to image eight bidirectional communication paths for one node (processor). If the number of nodes (processors) is counted on a t-axis which is assumed to be an axis along the bidirectional communication path added anew, it counts three and the lengths are expressed as 2×2×2×3. Therefore, the longest axis in this example is the fourth-dimensional axis having the length of 3. The "longest axis" has an important meaning in the present invention. Moreover, as for the n-dimensional network, those skilled in the art will be able to easily expand and apply the present invention to the n-dimensional network.

FIG. 4 shows a diagram illustrating how the performance of a parallelized 1D FFT varies according to the configuration of the numbers of the nodes (processors) on the axes constituting a torus.

First, a cubic torus of 2×2×2 (=8) and a non-cubic torus of 2×2×4 (=16) are shown as three-dimensional network cubic images within the dotted line. If there is a limitation on the number of nodes (processors), for example, a cubic configuration of 3×3×3 (=27) cannot always be made. Therefore, a non-cubic configuration is used in many situations.

In the configuration of 2×1×1, a mesh is distinguished from a torus by a difference of whether there is a bidirectional communication path connecting nodes (processors) at both ends of each axis of the cube as shown within the dotted line. Since the expression is complicated in a state where a group is formed, the bidirectional communication paths are not shown here.

For a performance comparison, the performance of the parallelized 1D FFT is compared between a torus of 8×8×8 (=512) and a non-cubic torus of 8×8×16 (=1024). A "form based on dimensions" is a "form based on three dimensions" in this diagram, and therefore the form is cubic in some cases or non-cubic in other cases.

The performance of Blue Gene/P (Blue Gene and Blue Gene/P are trademarks of IBM Corporation) was measured. GFLOPS stands for gigaflops as a unit. By right, the performance is expected to be twice since the number of usable nodes (processors) increases from 512 to 1024, which is a double increase. The peak performance, however, is maintained as it is.

Moreover, the proportion of all-to-all communications to the total number of communications increases from 54% to 70% and the length of the longest axis is 16, which is twice larger than 8, and therefore the bandwidth of all-to-all communications becomes less than half.

Figure 5:
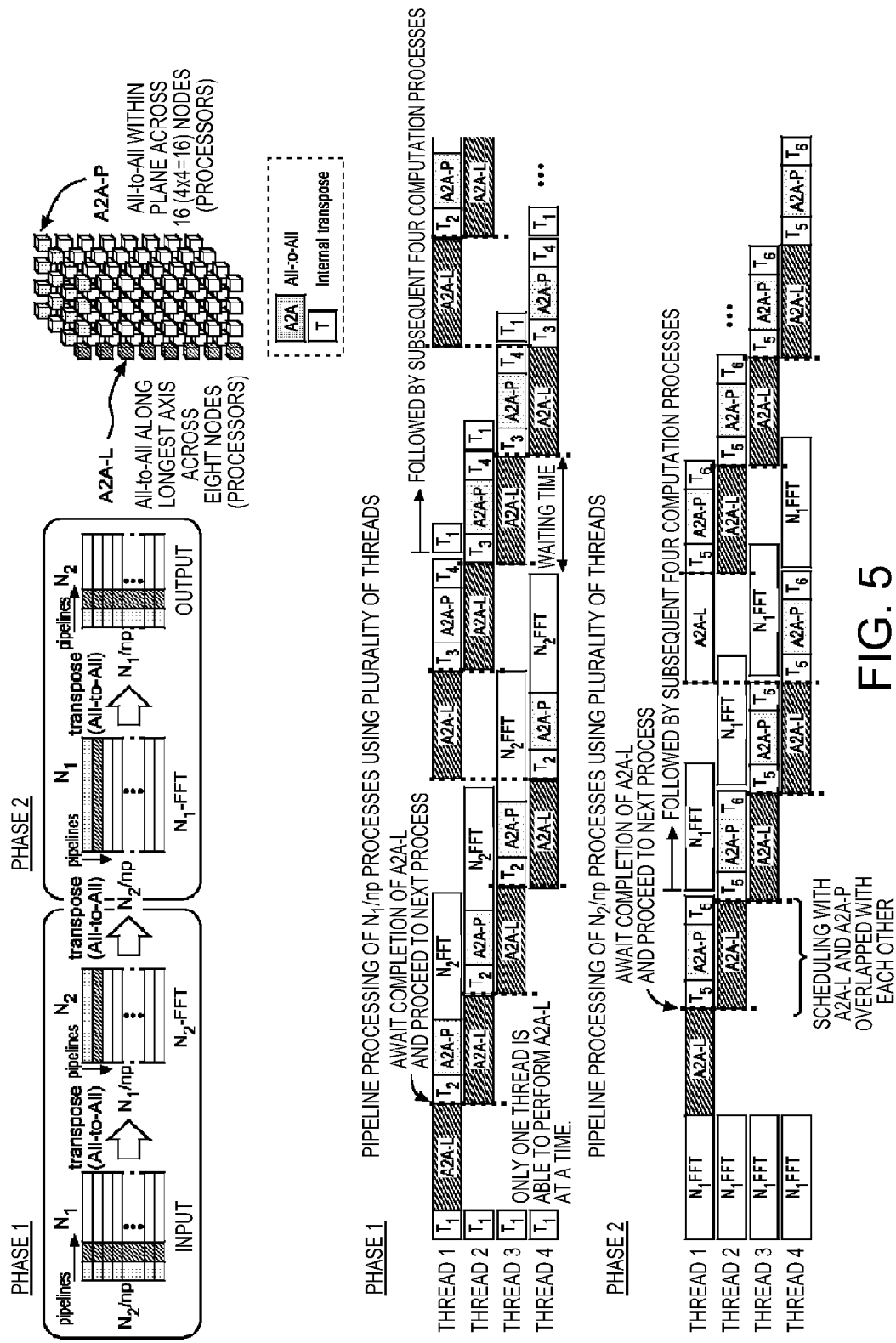
FIG. 5 is a diagram illustrating a method of scheduling a plurality of computation processes including all-to-all communications (A2A) among a plurality of nodes (processors) by applying the present invention.

FIG. 5 shows a diagram illustrating a method of scheduling a plurality of computation processes including all-to-all communications (A2A) among a plurality of nodes (processors) by applying the present invention. According to the parallelized 1D (one-dimensional) FFT algorithm shown in FIG. 1(B), the processing is performed with being divided into phase 1 and phase 2 as shown. In this regard, it is supposed that there are four threads in accordance with the internal configuration of the node (processor) in FIG. 2(B) to schedule pipeline processing using a plurality of threads.

With respect to a non-cubic torus in which a three-dimensional network is composed of a plurality of nodes (processors) of 4×4×8 (=128), the longest axis has a length of 8, and a plurality of eight nodes (processors) in the axial form are selected as a first subgroup including the longest axis. The communication phase for processing all-to-all communications only among the plurality of eight nodes (processors) included in the first subgroup is referred to as A2A-L (L is an initial of Longest) here.

With respect to a non-cubic torus in which a three-dimensional network is composed of a plurality of nodes (processors) of 4×4×8 (=128), the nodes (processors) in a second subgroup including all axes (4×4) other than the longest axis form a plane (in other words, a form based on two dimensions due to the number of axes, two). The communication phase for processing all-to-all communications only among the plurality of 16 (4×4) nodes (processors) included in the second subgroup is referred to as A2A-P (P is an initial of Plane) here.

If there are two or more longest axes, the first subgroup has a form based on the number of dimensions which is equal to the number of the longest axes, though not shown here. Similarly, if there are two or more longest axes, the second subgroup sometimes has a form of an axis or an empty set (zero dimension) instead of a plane or a multi-dimensional solid, though not shown here.

It should be noted here that there are nodes (processors) included in common in both the nodes (processors) included in the first subgroup and the nodes (processors) included in the second subgroup. Although only one node (processor) is included in common in this case, the result of the computation process of the first subgroup has a connection to the result of the computation process of the second subgroup via the node (processor).

Subsequently, it is understood that the scheduling of the pipeline processing between the phase 1 and the phase 2 is adapted to (make overlapping so as to) enable a plurality of computation processes to be processed in parallel (pipelined) by dividing the processing into thread 1, thread 2, thread 3, and thread 4.

In addition, the present invention is characteristic in that the processing is scheduled so as to enable only one thread to perform A2A-L at a time. As indicated by the dotted line, the processing is scheduled so as to await the completion of an A2A-L process before proceeding to the next process. Typically, the portion indicated by the dotted line is seamless and the processing is scheduled so as to be performed sequentially (or seamlessly).

The present invention is characteristic also in that A2A-L and A2A-P are overlapped with each other and this enables an effective use of the time required for A2A-L. For example, an FFT computation process or a T (a transpose, which is an internal transpose here) computation process is able to be inserted for an effective use.

FIG. 6 shows a diagram illustrating how the performance of a parallelized 1D FFT varies according to the configuration of the numbers of the nodes (processors) constituting a torus on the axes as an effect of applying the present invention. A part of the table is the same as in FIG. 4.

It is understood that the processing speed increases in the case where the present invention is used in comparison with the case where the present invention is not used. Particularly when the axis of nodes (processors) is formed in a non-cubic torus, the superiority of the present invention is remarkable.

The invention claimed is:

1. A method of scheduling a plurality of computation processes including all-to-all communications (A2A) among a plurality of processor nodes constituting a network of processor nodes having a torus or a mesh form based on n (n>2) dimensions on an n-dimensional space, the method comprising the steps of:

selecting, by a processor node, a first plurality of processor nodes from the plurality of processor nodes, the first plurality of processor nodes forming a longest axis corresponding to a dimension of said network of processor nodes as a first subgroup;

providing a first processing comprising an all-to-all longest communications (A2A-L) only among the first plurality of processor nodes included in the first subgroup;

selecting, by the processor node, a second plurality of processor nodes from the plurality of processor nodes, the second plurality of processor nodes including all remaining axes other than the longest axis as a second subgroup;

providing a second processing comprising an all-to-all plane communications (A2A-P) only among the second plurality of processor nodes included in the second subgroup; and scheduling, using a plurality of threads in the processor node, the plurality of computation processes for pipelined parallel processing at the processor node in a first time interval and subsequent time intervals such that in a second time interval immediately following the first time interval and in said subsequent time intervals the first all-to-all longest communications processing (A2A-L) overlaps with the second all-to-all plane communications processing (A2A-P) across the plurality of threads in the processor node and such that a single thread of the processor node is only able to perform said first all-to-all longest communications processing (A2A-L) in the first time interval and said subsequent time intervals, and the completion of said first all-to-all longest communications processing (A2A-L) in the first subgroup occurs before proceeding to a next computation process at said single thread, wherein said next computation process at said single thread includes said all-to-all plane communications processing (A2A-P) in the second subgroup, and said scheduling including scheduling the plurality of computation processes for said pipelined parallel processing in such a way as to enable the first all-to-all longest communications processing (A2A-L) all at a first thread of the processor node and a Fast Fourier Transformation (FFT) computation process or a matrix transpose computation process at a second thread of the processor node to be processed in parallel.

2. The method according to claim 1, further comprising the step of selecting a group including all nodes as a first group in a case where all axes have the same length and scheduling the computation processes in such a way that the all-to-all communications in the first subgroup are sequentially performed.

3. The method of claim 1, wherein said network of processor nodes comprises one or more longest axes, said selected processor nodes of said first subgroup arranged in an axial form in a case where there is only one longest axis, or said selected processor nodes of said first subgroup arranged in a form based on the number of network dimensions which is equal to the number of the longest axes.

4. The scheduling method of claim 1, configured for transforming a 1-Dimensional Fast Fourier Transform (FFT) of length N into a two-dimensional (2D) FFT (N>N2) where N=N1×N2, wherein N1 and N2 are the lengths of two FFT dimensions.

5. A method of scheduling a plurality of computation processes including all-to-all communications (A2A) among a plurality of processor nodes constituting a network of processor nodes having a cubic or non-cubic torus or mesh form on a three-dimensional space, the method comprising the steps of:
   selecting, by a processor node, a first plurality of processor nodes from the plurality of nodes, the first plurality of processor nodes forming a longest axis corresponding to a dimension of said network of processor nodes as a first subgroup;
   providing a first processing comprising an all-to-all longest communications (A2A-L) only among the first plurality of processor nodes included in the first subgroup;
   selecting a second plurality of processor nodes from said plurality of processor nodes, the second plurality of processor nodes including all remaining axes other than the longest axis as a second subgroup;
   providing a second processing comprising an all-to-all plane communications (A2A-P) only among the second plurality of processor nodes included in the second subgroup; and
   scheduling, using a plurality of threads in the processor node, the plurality of computation processes for pipelined parallel processing at the processor node in a first time interval and subsequent time intervals such that in a second time interval immediately following the first time interval and in said subsequent time intervals the first all-to-all longest communications processing (A2A-L) overlaps with the second all-to-all plane communications processing (A2A-P) across the plurality of threads in the processor node and such that a single thread of the processor node is only able to perform said first all-to-all longest communications processing (A2A-L) in the first time interval and said subsequent time intervals, and the completion of said first all-to-all longest communications processing (A2A-L) in the first subgroup occurs before proceeding to a next computation process at said single thread,
   wherein said next computation process at said single thread includes said all-to-all plane communications processing (A2A-P) in the second subgroup, and
   said scheduling including scheduling the plurality of computation processes for said pipelined parallel processing in such a way as to enable the first all-to-all longest communications processing (A2A-L) at a first thread of the processor node, and a Fast Fourier Transformation (FFT) computation process or a matrix transpose computation process at a second thread of the processor node to be processed in parallel.

6. The method of claim 5, wherein said network of processor nodes comprises a single longest axis, said selected processor nodes of said first subgroup arranged in an axial form in a case where there is only one longest axis, or said selected processor nodes of said first subgroup are arranged in a plane.

7. The scheduling method of claim 5, configured for transforming a 1-Dimensional Fast Fourier Transform (FFT) of length N into a two-dimensional (2D) FFT (N>N2) where N=N1×N2, wherein N1 and N2 are the lengths of two FFT dimensions.

8. A computer program product for scheduling a plurality of computation processes including all-to-all communications (A2A) for one or more processors nodes among a plurality of processor nodes constituting a network of processor nodes having a torus or a mesh form based on n (n>2) dimensions on an n-dimensional space and causing the one or more processor nodes to execute the scheduling, the computer program product embodied as a non-transitory machine readable storage medium, the machine readable storage medium storing a program code executable by a processor device, the code comprising:
   a code for causing the one or more processor nodes to select a first plurality of processor nodes from the plurality of nodes, the first plurality of processor nodes forming a longest axis corresponding to a dimension of said network of processor nodes as a first subgroup;
   a code for causing the one or more processor nodes to provide a first processing comprising an all-to-all longest communications (A2A-L) only among the first plurality of processor nodes included in the first subgroup;
   a code for causing the one or more processor nodes to select a second plurality of processor nodes from said plurality of processor nodes, the second plurality of processor nodes including all remaining axes other than the longest axis as a second subgroup;
   a code for causing the one or more processor nodes to provide a second processing comprising an all-to-all plane communications (A2A-P) only among the second plurality of processor nodes included in the second subgroup; and
   a code for causing the one or more processor nodes to schedule using a plurality of threads in a processor node, the plurality of computation processes for pipelined parallel processing at the processor node in a first time interval and subsequent time intervals such that in a second time interval immediately following the first time interval and in said subsequent time intervals the first all-to-all longest communications processing (A2A-L) overlaps with the second all-to-all plane communications processing (A2A-P) across the plurality of threads in the processor node and such that a single thread of the processor node is only able to perform said first all-to-all longest communications processing (A2A-L) in the first time interval and said subsequent time intervals, and the completion of said first all-to-all longest communications processing (A2A-L) in the first subgroup occurs before proceeding to a next computation process at said single thread,
   wherein said next computation process at said single thread includes said all-to-all plane communications processing (A2A-P) in the second subgroup, and
   said scheduling including scheduling the plurality of computation processes for said pipelined parallel processing in such a way as to enable the first all-to-all longest communications processing (A2A-L) at a first thread of the processor node, and a Fast Fourier Transformation (FFT) computation process or a matrix transpose computation process at a second thread of the processor node to be processed in parallel.

9. The computer program product according to claim 8, further comprising a code for causing the one or more processor nodes to select a group including all nodes as a first group in a case where all axes have the same length and to schedule the computation processes in such a way that the all-to-all communications in the first subgroup are sequentially performed.

10. The computer program product of claim 8, wherein said network of processor nodes comprises one or more longest axes, said selected processor nodes of said first subgroup arranged in an axial form in a case where there is only one longest axis, or said selected processor nodes of said first subgroup arranged in a form based on the number of network dimensions which is equal to the number of the longest axes.

11. The computer program product of claim 8 configured for transforming a 1-Dimensional Fast Fourier Transform (FFT) of length N into a two-dimensional (2D) FFT (N1, N2) where N=N1×N2, wherein N1 and N2 are the lengths of two FFT dimensions.

12. A computer program product for scheduling a plurality of computation processes including all-to-all communications (A2A) for one or more processor nodes among a plurality of processor nodes constituting a network of processor nodes having a cubic or non-cubic torus or mesh form on a three-dimensional space and causing the one or more processor nodes to execute the scheduling, the computer program product embodied as a non-transitory machine readable storage medium, the machine readable storage medium storing program code executable by a processor device comprising:
a code for causing the one or more processor nodes to select a first plurality of processor nodes from the plurality of nodes, the first plurality of processor nodes forming a longest axis corresponding to a dimension of said network of processor nodes as a first subgroup;
a code for causing the one or more processor nodes to provide a first processing comprising an all-to-all longest communications (A2A-L) only among the first plurality of processor nodes included in the first subgroup;
a code for causing the one or more processor nodes to select a second plurality of processor nodes from said plurality of processor nodes, the second plurality of processor nodes including all remaining axes other than the longest axis as a second subgroup;
a code for causing the one or more processor nodes to provide a second processing comprising an all-to-all plane communications (A2A-P) only among the second plurality of nodes included in the second subgroup; and
a code for causing the one or more processor nodes to schedule using a plurality of threads in a processor node the plurality of computation processes for pipelined parallel processing at the processor node in a first time interval and subsequent time intervals such that in a second time interval immediately following the first time interval and in said subsequent time intervals the first all-to-all longest communications processing (A2A-L) overlaps with the second all-to-all plane communications processing (A2A-P) across the plurality of threads in the processor node and such that a single thread of the processor node is only able to perform said first all-to-all longest communications processing (A2A-L) in the first time interval and said subsequent time intervals, and the completion of said first all-to-all longest communications processing (A2A-L) in the first subgroup occurs before proceeding to a next computation process at said single thread,
wherein said next computation process at said single thread includes said all-to-all plane communications processing (A2A-P) in the second subgroup, and
said scheduling including scheduling the plurality of computation processes for said pipelined parallel processing in such a way as to enable the first all-to-all longest communications processing (A2A-L) at a first thread of the processor node and a Fast Fourier Transformation (FFT) computation process or a matrix transpose computation process at a second thread of the processor node to be processed in parallel.

13. The computer program product of claim 12, wherein said network of processor nodes comprises a single longest axis, said selected processor nodes of said first subgroup arranged in an axial form in a case where there is only one longest axis, or said selected processor nodes of said first subgroup are arranged in a plane.

14. A parallel computer system comprising: a processor; wherein the processor is configured to performing a plurality of computation processes including all-to-all communications (A2A) in parallel among a plurality of processor nodes constituting a network of processor nodes having a torus or mesh form based on n (n>2) dimensions on an n-dimensional space, the parallel computer system performing the plurality of computation processes in parallel by:
selecting a first plurality of processor nodes from said plurality of processor nodes, the first plurality of processor nodes forming a longest axis corresponding to a dimension of said network of processor nodes as a first subgroup;
providing a first processing comprising an all-to-all longest communications (A2A-L) only among the first plurality of processor nodes included in the first subgroup;
selecting a second plurality of processor nodes from said plurality of processor nodes, the second plurality of processor nodes including all remaining axes other than the longest axis as a second subgroup;
providing a second processing comprising an all-to-all plane communications (A2A-P) only among the second plurality of processor nodes included in the second subgroup; and
scheduling, using a plurality of threads in a processor node, the plurality of computation processes for pipelined parallel processing at the processor node in a first time interval and subsequent time intervals such that in a second time interval immediately following the first time interval and in said subsequent time intervals the first all-to-all longest communications processing (A2A-L) overlaps with the second all-to-all plane communications processing (A2A-P) across the plurality of threads in each processor node and such that a single thread of the processor node is only able to perform said first all-to-all longest communications processing (A2A-L) in the first time interval and said subsequent time intervals, and the completion of said first all-to-all longest communications processing (A2A-L) in the first subgroup occurs before proceeding to a next computation process at said single thread,
wherein said next computation process at said single thread includes said all-to-all plane communications processing (A2A-P) in the second subgroup, and
said scheduling including scheduling the plurality of computation processes for said pipelined parallel processing in such a way as to enable the first all-to-all longest communications processing (A2A-L) all at a first thread of the processor node and a Fast Fourier Transformation (FFT) computation process or a matrix transpose computation process at a second thread of the processor node to be processed in parallel.

15. The parallel computer system of claim 14, wherein said network of processor nodes comprises one or more longest axes, said selected processor nodes of said first subgroup arranged in an axial form in a case where there is only one longest axis, or said selected processor nodes of said first subgroup arranged in a form based on the number of network dimensions which is equal to the number of the longest axes.

16. The parallel computer system of claim 14 configured for transforming a 1-Dimensional Fast Fourier Transform (FFT) of length N into a two-dimensional (2D) FFT (N>N2) where N=N1×N2, wherein N1 and N2 are the lengths of two FFT dimensions.

17. A parallel computer system comprising: a processor; wherein the processor is configured to perform a plurality of computation processes including all-to-all communications (A2A) in parallel among a plurality of processor nodes constituting a network of processor nodes having a cubic or non-cubic torus or mesh form on a three-dimensional space, the parallel computer system performing the plurality of computation processes in parallel by:

selecting a first plurality of processor nodes from said plurality of processor nodes, the first plurality of processor nodes forming a longest axis corresponding to a dimension of said network of processor nodes as a first subgroup;

providing a first processing comprising an all-to-all longest communications (A2A-L) only among the first plurality of processor nodes included in the first subgroup;

selecting a second plurality of processor nodes from said plurality of processor nodes, the second plurality of processor nodes including all remaining axes other than the longest axis as a second subgroup;

providing a second processing comprising an all-to-all plane communications (A2A-P) only among the second plurality of nodes included in the second subgroup; and scheduling, using a plurality of threads in a processor node, the plurality of computation processes for pipelined parallel processing at the processor node in a first time interval and subsequent time intervals such that in a second time interval immediately following the first time interval and in said subsequent time intervals the first all-to-all longest communications processing (A2A-L) processing overlaps with the second all-to-all plane communications processing (A2A-P) across the plurality of threads in the processor node and such that a single thread of the processor node is only able to perform said first all-to-all longest communications processing A2A-L in the first time interval and said subsequent time intervals, and the completion of said first all-to-all longest communications processing (A2A-L) in the first subgroup occurs before proceeding to a next computation process at said single thread, wherein said next computation process at said single thread includes said all-to-all plane communications processing (A2A-P) in the second subgroup, and said scheduling including scheduling the plurality of computation processes for said pipelined parallel processing in such a way as to enable the first all-to-all longest communications processing (A2A-L) at a first thread of the processor node and a Fast Fourier Transformation (FFT) computation process or a matrix transpose computation process at a second thread of the processor node to be processed in parallel.

18. The parallel computer system of claim 17, wherein said network of processor nodes comprises a single longest axis, said selected processor nodes of said first subgroup arranged in an axial form in a case where there is only one longest axis, or said selected processor nodes of said first subgroup arranged in a plane.

* * * * *